United States Patent
Shinohara

(10) Patent No.: US 7,911,715 B2
(45) Date of Patent: Mar. 22, 2011

(54) IMAGING LENS AND IMAGING APPARATUS

(75) Inventor: Yoshikazu Shinohara, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/360,674

(22) Filed: Jan. 27, 2009

(65) Prior Publication Data
US 2009/0207508 A1 Aug. 20, 2009

(30) Foreign Application Priority Data

Feb. 14, 2008 (JP) ............... P2008-033396

(51) Int. Cl.
G02B 9/34 (2006.01)
(52) U.S. Cl. ........................ 359/779; 359/771
(58) Field of Classification Search .......... 359/754–757, 359/759, 760, 763, 764, 767–769, 771, 772, 359/779
See application file for complete search history.

(56) References Cited

U.S. PATENT DOCUMENTS 6,813,099 B2 * 11/2004 Yamaguchi ................ 359/779
7,321,474 B1 1/2008 Jo 2002/0181121 A1 12/2002 Kawakami
2004/0012861 A1 1/2004 Yamaguchi
2006/0132933 A1 6/2006 Nio et al.

FOREIGN PATENT DOCUMENTS

| EP | 1 382 985 A2 | 1/2004 |
| EP | 1 868 021 A1 | 12/2007 |
| JP | 2002-228922 A | 8/2002 |
| JP | 2002-365529 A | 12/2002 |
| JP | 2004-53813 A | 2/2004 |
| JP | 2004-102234 A | 4/2004 |

* cited by examiner

Primary Examiner — Darryl J Collins
(74) Attorney, Agent, or Firm — Birch, Stewart, Kolasch & Birch, LLP

(57) ABSTRACT

An imaging lens includes in order from an object side: a first lens including a positive lens having a convex surface directed to the object side; a stop; a second lens including a positive lens having a convex surface directed to an image side; a third lens including a negative meniscus lens with a concave surface directed to the object side; and a fourth lens including, near an optical axis, a positive meniscus shape with a convex surface directed to the object side. An air space between the second lens and the third lens is smaller in a periphery than near the optical axis. And f1>f2>|f3| and 1.0<f/f2<1.5 are satisfied where f1, f2 and f3 are focal lengths of the first lens, the second lens, and the third lens, respectively and f is an focal length of the whole lens system.

18 Claims, 19 Drawing Sheets

EXAMPLE 1

EXAMPLE 1

EXAMPLE 2

EXAMPLE 3

EXAMPLE 4

EXAMPLE 5

FIG. 6A

EXAMPLE 1 : BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 1 | 2.389 | 0.88 | 1.511956 | 56.5 |
| 2 | 12.6549 | 0.06 | | |
| 3 (AP) | — | 0.41 | | |
| 4 | −3.0266 | 1.07 | 1.511956 | 56.5 |
| 5 | −1.3461 | 0.41 | | |
| 6 | −0.6753 | 0.65 | 1.620288 | 25.5 |
| 7 | −1.3953 | 0.10 | | |
| 8 | 1.7577 | 1.10 | 1.511956 | 56.5 |
| 9 | 3.7296 | 1.00 | | |
| 10 | ∞ | 0.98 | 1.518463 | 64.1 |
| 11 | ∞ | 0.64 | | |

Rows 1–2: G1; Rows 4–5: G2; Rows 6–7: G3; Rows 8–9: G4; Rows 10–11: GF

* AP : APERTURE DIAPHRAGM

FIG. 6B

| EXAMPLE 1 : ASPHERIC DATA | | | | |
|---|---|---|---|---|
| S No. | K | B3 | B4 | B5 | B6 |
| 1 | 0.00E+00 | −1.39E−02 | 4.11E−02 | 4.00E−03 | −9.87E−02 |
| 2 | 0.00E+00 | 9.88E−03 | −8.37E−02 | 1.08E−01 | 1.59E−01 |
| 4 | −1.00E+00 | 8.20E−02 | −4.17E−01 | 6.38E−01 | −6.23E−01 |
| 5 | −1.00E+00 | 2.21E−02 | −2.11E−01 | 1.95E−01 | −1.23E−01 |
| 6 | −9.52E−01 | −6.02E−02 | −6.85E−02 | 3.56E−02 | −6.49E−02 |
| 7 | −1.00E+00 | −5.78E−02 | 8.48E−02 | −8.92E−02 | 2.72E−02 |
| 8 | −9.09E−01 | −3.40E−02 | −5.45E−02 | 3.73E−02 | −4.87E−03 |
| 9 | −1.92E−06 | −7.21E−04 | −9.85E−03 | −4.06E−04 | 2.08E−04 |
| | B7 | B8 | B9 | B10 | B11 |
| 1 | 1.38E−01 | −2.93E−02 | −9.67E−02 | 7.94E−02 | 2.14E−02 |
| 2 | −4.04E−01 | −2.18E−01 | 1.52E−01 | 9.89E−01 | −6.04E−01 |
| 4 | 4.00E−02 | 5.55E−01 | −9.29E−01 | 5.53E−01 | 5.56E−02 |
| 5 | −2.47E−02 | 6.58E−03 | 1.51E−02 | 2.58E−02 | 4.26E−03 |
| 6 | −7.30E−03 | 5.19E−02 | 4.25E−02 | −2.58E−02 | −3.92E−03 |
| 7 | 6.63E−04 | 1.03E−03 | 2.88E−03 | −1.18E−03 | 1.37E−04 |
| 8 | −2.52E−03 | 1.04E−03 | −6.20E−04 | 1.26E−04 | 5.58E−05 |
| 9 | −1.04E−03 | 2.72E−04 | 1.11E−04 | −3.40E−05 | −3.91E−06 |
| | B12 | B13 | B14 | B15 | B16 |
| 1 | −1.54E−02 | −7.13E−02 | 4.91E−02 | 1.46E−02 | −1.32E−02 |
| 2 | −2.95E−01 | −1.53E−02 | 1.74E−01 | −2.27E−01 | 2.23E−01 |
| 4 | −7.09E−02 | −9.42E−02 | 9.43E−02 | −1.81E−01 | 9.66E−02 |
| 5 | −1.06E−02 | −9.38E−03 | −2.65E−03 | −4.28E−03 | 7.54E−03 |
| 6 | −4.37E−03 | −2.98E−03 | −2.98E−04 | 0.00E+00 | 1.96E−03 |
| 7 | −6.81E−05 | −1.12E−04 | −8.36E−05 | −1.73E−05 | 3.99E−05 |
| 8 | 2.01E−07 | −4.28E−06 | −2.45E−07 | −6.90E−07 | 2.10E−07 |
| 9 | 1.05E−06 | 5.09E−07 | −9.97E−08 | −2.49E−08 | 1.94E−09 |

\* S No. : SURFACE NUMBER

FIG. 7A

EXAMPLE 2: BASIC LENS DATA

| Si<br>SURFACE<br>NUMBER | Ri<br>CURVATURE<br>RADIUS | Di<br>SURFACE<br>SPACING | Ndj<br>REFRACTIVE<br>INDEX | νdj<br>ABBE NUMBER |
|---|---|---|---|---|
| 1 | 2.4075 | 0.88 | 1.511956 | 56.5 |
| 2 | 12.8176 | 0.06 | | |
| 3 (AP) | — | 0.42 | | |
| 4 | −3.0728 | 1.07 | 1.511956 | 56.5 |
| 5 | −1.2964 | 0.37 | | |
| 6 | −0.6593 | 0.65 | 1.620288 | 25.5 |
| 7 | −1.4665 | 0.10 | | |
| 8 | 1.6053 | 1.17 | 1.511956 | 56.5 |
| 9 | 3.5277 | 1.00 | | |
| 10 | ∞ | 0.98 | 1.518463 | 64.1 |
| 11 | ∞ | 0.64 | | |

G1: 1–2
G2: 4–5
G3: 6–7
G4: 8–9
GF: 10–11

* AP : APERTURE DIAPHRAGM

FIG. 7B

| EXAMPLE 2 : ASPHERIC DATA | | | | |
|---|---|---|---|---|
| S No. | K | B3 | B4 | B5 | B6 |
| 1 | 0.00E+00 | -2.96E-03 | 2.64E-02 | 2.90E-03 | -9.01E-02 |
| 2 | 0.00E+00 | -3.12E-03 | -2.73E-02 | 2.38E-02 | 1.49E-01 |
| 4 | -1.00E+00 | 4.00E-02 | -3.21E-01 | 5.81E-01 | -6.66E-01 |
| 5 | -1.00E+00 | 2.10E-02 | -2.02E-01 | 1.89E-01 | -1.25E-01 |
| 6 | -9.59E-01 | -2.92E-02 | -6.61E-02 | 2.71E-02 | -7.13E-02 |
| 7 | -9.98E-01 | -6.13E-02 | 9.99E-02 | -9.19E-02 | 2.38E-02 |
| 8 | -9.55E-01 | -5.86E-02 | -4.61E-02 | 4.42E-02 | -9.00E-03 |
| 9 | -4.29E-09 | -6.89E-03 | -5.90E-03 | -2.96E-03 | 7.23E-04 |
|  | B7 | B8 | B9 | B10 | B11 |
| 1 | 1.44E-01 | -2.91E-02 | -1.02E-01 | 7.44E-02 | 2.12E-02 |
| 2 | -3.45E-01 | -1.46E-01 | 9.89E-02 | 9.64E-01 | -6.47E-01 |
| 4 | 2.67E-02 | 5.94E-01 | -8.61E-01 | 5.93E-01 | 2.37E-02 |
| 5 | -2.07E-02 | 6.64E-03 | 1.26E-02 | 2.56E-02 | 4.52E-03 |
| 6 | -1.07E-02 | 5.09E-02 | 4.36E-02 | -2.49E-02 | -3.49E-03 |
| 7 | -6.01E-04 | 5.99E-04 | 3.00E-03 | -9.96E-04 | 2.92E-04 |
| 8 | -2.85E-03 | 1.29E-03 | -5.81E-04 | 1.37E-04 | 5.76E-05 |
| 9 | -8.10E-04 | 1.69E-04 | 1.12E-04 | -3.00E-05 | -6.18E-06 |
|  | B12 | B13 | B14 | B15 | B16 |
| 1 | -1.45E-02 | -6.99E-02 | 5.04E-02 | 1.59E-02 | -1.50E-02 |
| 2 | -2.76E-01 | -3.70E-02 | 1.88E-01 | -1.70E-01 | 2.02E-01 |
| 4 | -1.59E-01 | -1.74E-01 | 8.17E-02 | -1.07E-01 | 1.42E-01 |
| 5 | -9.91E-03 | -9.02E-03 | -2.76E-03 | -4.77E-03 | 7.63E-03 |
| 6 | -3.91E-03 | -2.51E-03 | 5.08E-04 | 0.00E+00 | 1.29E-03 |
| 7 | -6.36E-06 | -1.05E-04 | -9.92E-05 | -3.07E-05 | 4.22E-05 |
| 8 | -1.40E-06 | -5.32E-06 | -3.18E-07 | -6.96E-07 | 2.38E-07 |
| 9 | 1.34E-06 | 6.25E-07 | -7.33E-08 | -3.76E-08 | 2.02E-09 |

* S No. : SURFACE NUMBER

FIG. 8A

EXAMPLE 3 : BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 1 | 2.437 | 0.87 | 1.511956 | 56.5 |
| 2 | 13.4644 | 0.06 | | |
| 3 (AP) | — | 0.42 | | |
| 4 | -3.1731 | 1.07 | 1.511956 | 56.5 |
| 5 | -1.3207 | 0.38 | | |
| 6 | -0.6521 | 0.65 | 1.620288 | 25.5 |
| 7 | -1.538 | 0.10 | | |
| 8 | 1.4733 | 1.18 | 1.511956 | 56.5 |
| 9 | 3.4945 | 1.00 | | |
| 10 | ∞ | 0.98 | 1.518463 | 64.1 |
| 11 | ∞ | 0.64 | | |

G1: 1,2
G2: 4,5
G3: 6,7
G4: 8,9
GF: 10,11

* AP : APERTURE DIAPHRAGM

FIG. 8B

| EXAMPLE 3 : ASPHERIC DATA | | | | | |
|---|---|---|---|---|---|
| S No. | K | B3 | B4 | B5 | B6 |
| 1 | 0.00E+00 | -3.23E-03 | 2.72E-02 | -1.82E-03 | -8.67E-02 |
| 2 | 0.00E+00 | -5.22E-03 | -1.80E-04 | -5.65E-02 | 1.86E-01 |
| 4 | -1.00E+00 | 3.43E-02 | -2.83E-01 | 5.15E-01 | -6.59E-01 |
| 5 | -1.00E+00 | 2.23E-02 | -1.89E-01 | 1.77E-01 | -1.33E-01 |
| 6 | -8.71E-01 | 2.76E-03 | -7.58E-02 | 1.41E-02 | -7.58E-02 |
| 7 | -8.41E-01 | -7.50E-02 | 1.07E-01 | -9.03E-02 | 2.35E-02 |
| 8 | -4.90E-01 | -9.16E-02 | -4.51E-02 | 5.16E-02 | -1.22E-02 |
| 9 | -3.30E-01 | -7.08E-03 | -3.28E-03 | -4.73E-03 | 8.69E-04 |
| | B7 | B8 | B9 | B10 | B11 |
| 1 | 1.46E-01 | -2.81E-02 | -1.07E-01 | 7.38E-02 | 2.53E-02 |
| 2 | -2.73E-01 | -7.27E-02 | -4.04E-02 | 8.49E-01 | -6.79E-01 |
| 4 | 6.37E-02 | 6.40E-01 | -8.50E-01 | 5.37E-01 | -8.28E-02 |
| 5 | -1.63E-02 | 9.02E-03 | 1.19E-02 | 2.65E-02 | 4.56E-03 |
| 6 | -1.04E-02 | 5.37E-02 | 4.77E-02 | -2.29E-02 | -3.54E-03 |
| 7 | -6.55E-04 | 3.65E-04 | 3.06E-03 | -9.20E-04 | 3.74E-04 |
| 8 | -2.82E-03 | 1.52E-03 | -5.41E-04 | 1.23E-04 | 5.30E-05 |
| 9 | -5.32E-04 | 8.49E-05 | 1.20E-04 | -2.31E-05 | -1.01E-05 |
| | B12 | B13 | B14 | B15 | B16 |
| 1 | -1.52E-02 | -7.09E-02 | 5.00E-02 | 1.75E-02 | -1.58E-02 |
| 2 | -2.10E-01 | 9.92E-02 | 3.28E-01 | -1.34E-01 | -4.68E-02 |
| 4 | -2.28E-01 | -1.22E-01 | 2.91E-01 | 9.66E-02 | -1.63E-01 |
| 5 | -1.02E-02 | -9.50E-03 | -3.15E-03 | -4.97E-03 | 8.19E-03 |
| 6 | -4.86E-03 | -3.59E-03 | -5.68E-04 | 0.00E+00 | 1.98E-03 |
| 7 | 8.16E-06 | -1.22E-04 | -1.26E-04 | -4.39E-05 | 5.35E-05 |
| 8 | -2.91E-06 | -5.52E-06 | 1.47E-07 | -7.31E-07 | 2.30E-07 |
| 9 | 1.28E-06 | 7.57E-07 | -1.66E-08 | -5.43E-08 | 3.01E-09 |

\* S No. : SURFACE NUMBER

FIG.9A

EXAMPLE 4 : BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 1 | 2.3981 | 0.74 | 1.511956 | 56.5 |
| 2 | 24.0152 | 0.05 | | |
| 3 (AP) | — | 0.39 | | |
| 4 | −2.8241 | 0.93 | 1.511956 | 56.5 |
| 5 | −1.284 | 0.41 | | |
| 6 | −0.6162 | 0.60 | 1.609879 | 27.2 |
| 7 | −1.2937 | 0.10 | | |
| 8 | 1.4478 | 0.88 | 1.511956 | 56.5 |
| 9 | 2.9445 | 1.00 | | |
| 10 | ∞ | 0.95 | 1.518463 | 64.1 |
| 11 | ∞ | 0.58 | | |

G1: 1,2
G2: 4,5
G3: 6,7
G4: 8,9
GF: 10,11

* AP : APERTURE DIAPHRAGM

FIG.9B

| EXAMPLE 4 : ASPHERIC DATA | | | | | |
|---|---|---|---|---|---|
| S No. | K | B3 | B4 | B5 | B6 |
| 1 | 0.00E+00 | -1.68E-02 | 4.51E-02 | 9.75E-03 | -1.59E-01 |
| 2 | 0.00E+00 | 2.47E-02 | -1.78E-01 | 2.61E-01 | 2.61E-01 |
| 4 | -1.00E+00 | 8.72E-02 | -5.16E-01 | 9.15E-01 | -9.94E-01 |
| 5 | -1.00E+00 | 1.86E-02 | -2.40E-01 | 2.57E-01 | -1.99E-01 |
| 6 | -5.45E-01 | -2.48E-02 | -3.35E-02 | 7.69E-02 | -1.14E-01 |
| 7 | -9.85E-01 | -1.02E-01 | 1.12E-01 | -1.11E-01 | 5.39E-02 |
| 8 | -6.52E-03 | -8.73E-02 | -5.44E-02 | 3.23E-02 | 4.79E-04 |
| 9 | -1.86E-02 | 1.59E-02 | -4.05E-02 | 9.09E-03 | -1.78E-03 |
| | B7 | B8 | B9 | B10 | B11 |
| 1 | 2.40E-01 | -7.20E-02 | -2.03E-01 | 2.01E-01 | 6.24E-02 |
| 2 | -7.84E-01 | -6.41E-01 | 6.46E-01 | 2.50E+00 | -1.66E+00 |
| 4 | 9.58E-02 | 1.08E+00 | -2.06E+00 | 1.35E+00 | 2.99E-01 |
| 5 | -3.94E-02 | 3.05E-02 | 5.03E-02 | 6.06E-02 | 3.58E-03 |
| 6 | -2.96E-02 | 9.10E-02 | 8.70E-02 | -5.80E-02 | -2.65E-03 |
| 7 | 1.75E-03 | 2.23E-04 | 3.77E-03 | -4.33E-03 | -2.47E-04 |
| 8 | -4.05E-03 | 1.48E-03 | -1.42E-03 | 2.82E-04 | 1.45E-04 |
| 9 | -3.73E-05 | 1.65E-04 | 7.46E-05 | -1.10E-04 | 8.80E-06 |
| | B12 | B13 | B14 | B15 | B16 |
| 1 | -4.41E-02 | -2.32E-01 | 1.64E-01 | 4.76E-02 | -4.50E-02 |
| 2 | -1.03E+00 | -2.29E-01 | 5.35E-01 | -7.77E-01 | 1.23E+00 |
| 4 | -1.55E-02 | -3.75E-01 | -6.93E-02 | -1.17E+00 | 1.22E+00 |
| 5 | -3.83E-02 | -3.16E-02 | -5.57E-03 | -1.15E-02 | 2.62E-02 |
| 6 | -7.14E-03 | -8.42E-03 | -6.81E-03 | 0.00E+00 | 7.95E-03 |
| 7 | -5.30E-05 | 8.65E-05 | 4.72E-05 | 4.43E-05 | 3.54E-06 |
| 8 | 5.69E-06 | -1.06E-05 | -8.34E-07 | -2.66E-06 | 7.39E-07 |
| 9 | 5.95E-06 | 1.75E-06 | -1.81E-07 | -4.67E-08 | -6.55E-08 |

* S No. : SURFACE NUMBER

FIG.10A

EXAMPLE 5 : BASIC LENS DATA

| Si SURFACE NUMBER | Ri CURVATURE RADIUS | Di SURFACE SPACING | Ndj REFRACTIVE INDEX | νdj ABBE NUMBER |
|---|---|---|---|---|
| 1 | 2.1643 | 0.91 | 1.511956 | 56.5 |
| 2 | 8.1905 | 0.06 | | |
| 3 (AP) | — | 0.42 | | |
| 4 | −3.3286 | 1.07 | 1.533675 | 55.4 |
| 5 | −1.4162 | 0.43 | | |
| 6 | −0.6667 | 0.65 | 1.620288 | 25.5 |
| 7 | −1.5134 | 0.10 | | |
| 8 | 1.5658 | 1.38 | 1.511956 | 56.5 |
| 9 | 3.3876 | 1.00 | | |
| 10 | ∞ | 0.98 | 1.518463 | 64.1 |
| 11 | ∞ | 0.23 | | |

G1: 1, 2
G2: 3(AP), 4, 5
G3: 6, 7
G4: 8, 9
GF: 10, 11

* AP : APERTURE DIAPHRAGM

FIG.10B

| EXAMPLE 5 : ASPHERIC DATA | | | | | |
|---|---|---|---|---|---|
| S No. | K | B3 | B4 | B5 | B6 |
| 1 | 0.00E+00 | -6.24E-03 | 3.59E-02 | 2.33E-03 | -8.85E-02 |
| 2 | 0.00E+00 | 2.58E-03 | -1.59E-02 | -5.39E-02 | 2.05E-01 |
| 4 | -1.00E+00 | 3.74E-02 | -2.94E-01 | 5.20E-01 | -6.54E-01 |
| 5 | -1.00E+00 | 2.82E-02 | -1.96E-01 | 1.80E-01 | -1.28E-01 |
| 6 | -8.23E-01 | 1.22E-02 | -7.80E-02 | 1.26E-02 | -7.95E-02 |
| 7 | -7.78E-01 | -7.11E-02 | 1.07E-01 | -9.26E-02 | 2.33E-02 |
| 8 | -5.61E-01 | -8.11E-02 | -5.05E-02 | 5.04E-02 | -1.16E-02 |
| 9 | -9.96E-01 | -9.76E-03 | -5.86E-03 | -1.90E-03 | 9.42E-04 |
| | B7 | B8 | B9 | B10 | B11 |
| 1 | 1.43E-01 | -2.82E-02 | -1.08E-01 | 7.59E-02 | 2.84E-02 |
| 2 | -2.51E-01 | -1.50E-02 | -1.49E-01 | 7.88E-01 | -6.78E-01 |
| 4 | 7.71E-02 | 6.43E-01 | -8.67E-01 | 5.10E-01 | -7.64E-02 |
| 5 | -1.64E-02 | 7.43E-03 | 1.05E-02 | 2.45E-02 | 3.91E-03 |
| 6 | -1.23E-02 | 5.35E-02 | 4.76E-02 | -2.27E-02 | -3.33E-03 |
| 7 | -6.70E-04 | 4.28E-04 | 3.09E-03 | -8.98E-04 | 3.86E-04 |
| 8 | -2.59E-03 | 1.58E-03 | -5.47E-04 | 1.10E-04 | 4.90E-05 |
| 9 | -6.98E-04 | 3.22E-05 | 1.29E-04 | -1.82E-05 | -9.78E-06 |
| | B12 | B13 | B14 | B15 | B16 |
| 1 | -1.50E-02 | -7.16E-02 | 4.93E-02 | 1.75E-02 | -1.59E-02 |
| 2 | -1.57E-01 | 1.76E-01 | 3.82E-01 | -1.53E-01 | -1.72E-01 |
| 4 | -2.75E-01 | -9.03E-02 | 4.00E-01 | 1.86E-01 | -3.53E-01 |
| 5 | -9.59E-03 | -7.85E-03 | -2.59E-03 | -4.95E-03 | 7.43E-03 |
| 6 | -4.91E-03 | -3.60E-03 | -4.57E-04 | 0.00E+00 | 1.99E-03 |
| 7 | 5.17E-06 | -1.26E-04 | -1.31E-04 | -4.59E-05 | 5.55E-05 |
| 8 | -3.30E-06 | -5.26E-06 | 3.64E-07 | -6.73E-07 | 2.14E-07 |
| 9 | 1.29E-06 | 6.88E-07 | -3.98E-08 | -5.81E-08 | 7.61E-09 |

\* S No. : SURFACE NUMBER

FIG.11

| | VALUE OF CONDITIONAL EXPRESSION | | | | | |
|---|---|---|---|---|---|---|
| | EXPRESSION NUMBER | EXAMPLE 1 | EXAMPLE 2 | EXAMPLE 3 | EXAMPLE 4 | EXAMPLE 5 |
| f | | 4.56 | 4.56 | 4.56 | 4.14 | 4.56 |
| Ymax | | 3.57 | 3.57 | 3.57 | 3.24 | 3.57 |
| TL | | 7.30 | 7.33 | 7.35 | 6.05 | 6.98 |
| Bf | | 2.63 | 2.62 | 2.62 | 2.53 | 2.21 |
| f1 | (1) | 5.60 | 5.63 | 5.66 | 5.14 | 5.47 |
| f2 | (1) | 3.90 | 3.63 | 3.69 | 3.82 | 3.87 |
| f3 | (1) | −3.23 | −2.79 | −2.53 | −2.90 | −2.72 |
| f/f2 | (2) | 1.17 | 1.26 | 1.24 | 1.08 | 1.18 |
| f1/f2 | | 1.44 | 1.55 | 1.53 | 1.35 | 1.41 |
| f2/f3 | | −1.21 | −1.30 | −1.46 | −1.32 | −1.42 |
| $\nu d3$ | (3) | 25.5 | 25.5 | 25.5 | 27.2 | 25.5 |
| Bf/TL | (4) | 0.36 | 0.36 | 0.36 | 0.42 | 0.32 |
| Ymax/f | (5) | 0.78 | 0.78 | 0.78 | 0.78 | 0.78 |

EXAMPLE 1

SPHERICAL ABERRATION

EXAMPLE 1

ASTIGMATIZM

EXAMPLE 1

DISTORTION

EXAMPLE 2

SPHERICAL ABERRATION

EXAMPLE 2

ASTIGMATIZM

EXAMPLE 2

DISTORTION

FIG.14A
EXAMPLE 3
FIG.14B
EXAMPLE 3
FIG.14C
EXAMPLE 3
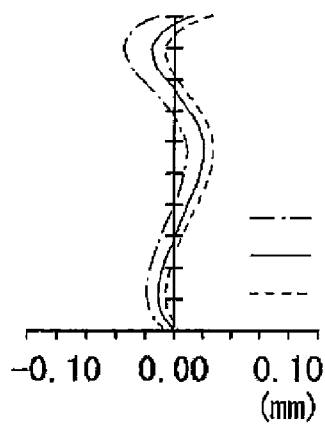
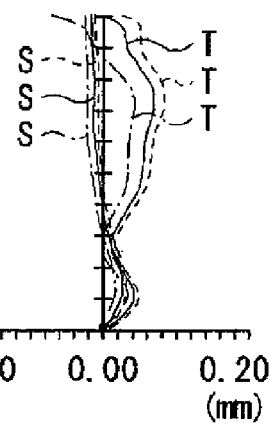
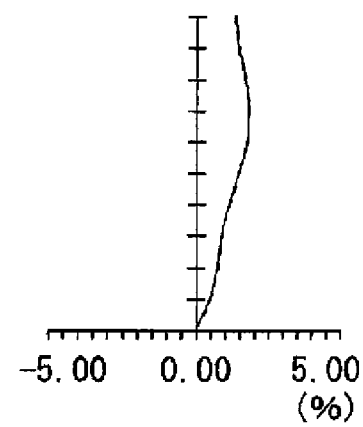
SPHERICAL ABERRATION
ASTIGMATIZM
DISTORTION
FIG.15A
EXAMPLE 4
FIG.15B
EXAMPLE 4
FIG.15C
EXAMPLE 4
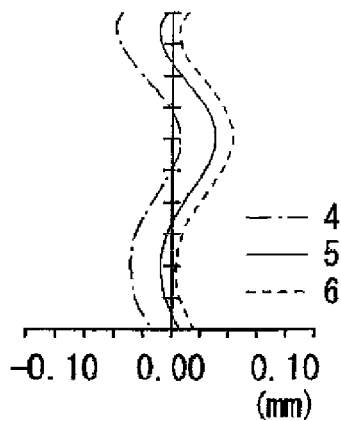
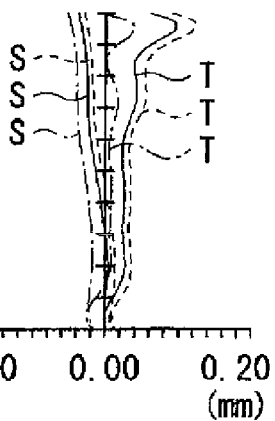
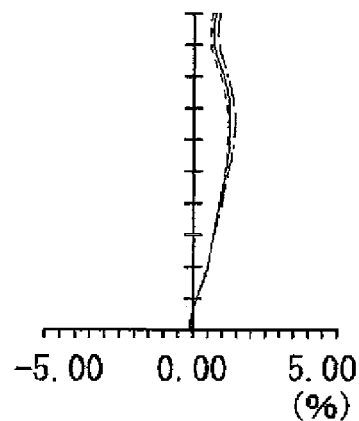
SPHERICAL ABERRATION
ASTIGMATIZM
DISTORTION

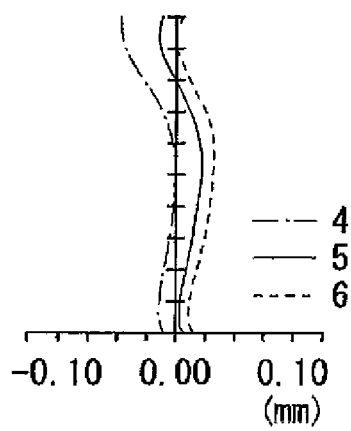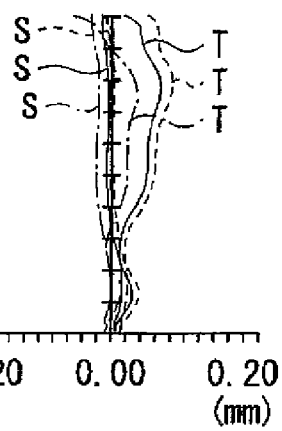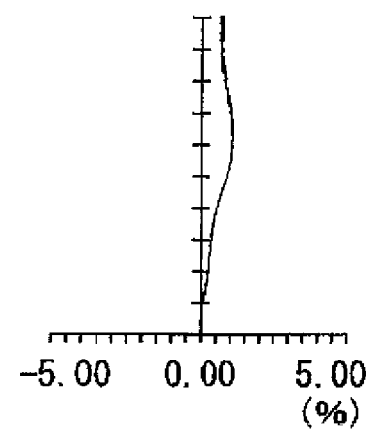
FIG.16A EXAMPLE 5 — SPHERICAL ABERRATION
FIG.16B EXAMPLE 5 — ASTIGMATIZM
FIG.16C EXAMPLE 5 — DISTORTION

IMAGING LENS AND IMAGING APPARATUS

CROSS-REFERENCE TO RELATED APPLICATIONS

This application is based on and claims priority under 35 USC 119 from Japanese Patent Application No. 2008-033396 filed Feb. 14, 2008; the entire contents of which are incorporated herein by reference.

BACKGROUND

1. Technical Field

The present invention relates to an imaging lens that forms an optical image of a subject on an imaging device such as a CCD (charge coupled device) or a CMOS (complementary metal oxide semiconductor) and to an imaging apparatus such as a digital still camera, a portable cellular phone, and a PDA (personal digital assistance) provided with the imaging lens and performing image taking.

2. Related Art

In recent years, with the spread of personal computers to ordinary households and the like, digital still cameras capable of inputting image information of taken images of landscapes, persons and the like to personal computers have been rapidly spreading. Moreover, more and more portable cellular phones have been provided with a camera module for image input. For apparatuses having such an imaging function, an imaging device such as a CCD or a CMOS is used. In recent years, these imaging devices have been made more and more compact, and the whole size of imaging apparatuses and the size of imaging lenses provided in the imaging apparatuses are required to be small. At the same time, the number of pixels of imaging devices has been increasing, and imaging lenses are required to have higher resolution and higher performance. For example, performance supporting as high as two mega-pixels or more, more suitably, five mega-pixels or more is required.

To satisfy these requests, an imaging lens of a structure using four lenses as a whole has been developed (see Patent Document 1 (JP-A-2002-228922 corresponding to US 2002/0181121), Patent Document 2 (JP-A-2004-053813 corresponding to US 2006/0132933) and Patent Document 3 (JP-A-2004-102234 corresponding to US 2004/0012861)).

Imaging lens having four lenses has been known in which the aperture diaphragm is disposed on the most object side (see Patent Document 1). However, as the angle of view is made wider, when the aperture diaphragm is disposed on the most object side, the performance degradation sensitivity to the manufacturing error and the lens surface position shift are apt to increase, and the manufacturability tends to be degraded. On the other hand, Patent Documents 2 and 3 disclose imaging lenses in which the aperture diaphragm is disposed between a first lens and a second lens. However, the power of the first lens is relatively high in the lens system, and if the angle of view is widened, the performance of, particularly, the field curvature is degraded, which makes the lens system insufficient in performance. It is demanded that a lens be developed that has high performance, for example, performance supporting as high as two mega-pixels or more, more desirably, approximately five to ten mega-pixels even though the angle of view is widened.

The present invention is made in view of such a problem, and an object thereof is to provide an imaging lens in which the angle of view is easily widened and a lens system with excellent manufacturability can be realized and an imaging apparatus provided with the imaging lens and capable of obtaining high-resolution taken images.

SUMMARY

An imaging lens according to the present invention includes in order from an object side: a first lens that includes a positive lens having a convex surface directed to the object side; a stop; a second lens that includes a positive lens having a convex surface directed to an image side; a third lens that includes a negative meniscus lens with a concave surface directed to the object side; and a fourth lens that includes, near an optical axis, a positive meniscus shape with a convex surface to the object side. An air space between the second lens and the third lens is smaller in a periphery than near the optical axis. And the following conditions are satisfied:

$$f1 > f2 > |f3| \qquad (1)$$

$$1.0 < f/f2 < 1.5 \qquad (2)$$

where f1 is a focal length of the first lens, f2 is a focal length of the second lens, f3 is a focal length of the third lens, and f is an focal length of the whole lens system.

In the imaging lens of the present invention, in a lens system including four lenses as a whole, since the configuration of each lens is made appropriate, the lens system is easily obtained in which the angle of view is easily widened and manufacturability is excellent. In particular, since the stop is disposed between the first lens and the second lens, the performance degradation sensitivity to the manufacturing error and the like is reduced, and manufacturability is excellent. Moreover, by making the power of the first lens relatively weak and making the powers of the second lens and the third lens strong in the lens system, the field curvature performance degradation due to increase in the angle of view and the like are improved, so that the angle of view is easily widened.

Further, by appropriately adopting and satisfying the following preferred structures, the optical performance can be made more excellent, and the angle of view is easily widened.

It is preferable for the imaging lens according to the present invention to satisfy the following conditional expression:

$$vd3 < 35 \qquad (3)$$

where vd3 is an Abbe number of the third lens at the d-line. This is advantageous to the correction of chromatic aberration.

Moreover, it is preferable to satisfy the following conditional expression:

$$0.2 < Bf/TL < 0.5 \qquad (4)$$

where Bf is a back focal length (length in air) and TL is an overall length (axial distance from a most object side surface to an image surface). Thereby, a back focal length necessary for disposing an optical member such as a filter is secured while the whole length is reduced.

Moreover, the imaging lens according to the present invention satisfies the following conditional expression, and is suitable for use on a comparatively wide-angle side:

$$0.7 < Y\max/f < 0.9 \qquad (5)$$

where Ymax is a maximum image height.

An imaging apparatus according to the present invention includes the imaging lens according to the present invention and an imaging device that outputs an imaging signal corresponding to an optical image formed by the imaging lens.

In the imaging apparatus according to the present invention, a high-resolution imaging signal is obtained based on a comparatively wide-angle and high-resolution optical image obtained by the imaging lens of the present invention.

According to the imaging lens of the present invention, in a lens system including four lens as a whole, the configuration of each lens is optimized, particularly, the aperture diaphragm is disposed between the first lens and the second lens, and the power of the first lens is made relatively weak and the powers of the second lens and the third lens are made strong in the lens system, so that a lens system can be realized in which the angle of view is easily widened and manufacturability is excellent.

Moreover, according to the imaging apparatus of the present invention, since an imaging signal corresponding to an optical image formed by the above-described high-performance imaging lens of the present invention is outputted, a comparatively wide-angle and high-resolution taken image can be obtained.

BRIEF DESCRIPTION OF THE DRAWINGS

FIGS. 6A and 6B are views showing the lens data of the imaging lens according to the first example of the present invention. FIG. 6A shows the basic lens data and FIG. 6B shows the aspheric data.

FIGS. 7A and 7B are views showing the lens data of the imaging lens according to the second example of the present invention. FIG. 7A shows the basic lens data and FIG. 7B shows the aspheric data.

FIGS. 8A and 8B are views showing the lens data of the imaging lens according to the third example of the present invention. FIG. 8A shows the basic lens data and FIG. 8B shows the aspheric data.

FIGS. 9A and 9B are views showing the lens data of the imaging lens according to the fourth example of the present invention. FIG. 9A shows the basic lens data and FIG. 9B shows the aspheric data.

FIGS. 10A and 10B are views showing the lens data of the imaging lens according to the fifth example of the present invention. FIG. 10A shows the basic lens data and FIG. 10B shows the aspheric data.

FIG. 11 is a view in which values of conditional expressions are summarized for each example.

FIG. 12A shows spherical aberration, FIG. 12B shows astigmatism, and FIG. 12C shows distortion.

FIG. 13A shows spherical aberration, FIG. 13B shows astigmatism, and FIG. 13C shows distortion.

FIGS. 14A to 14C are graphic representations of aberrations of the imaging lens according to the third example of the present invention. FIG. 14A shows spherical aberration, FIG. 14B shows astigmatism, and FIG. 14C shows distortion.

FIGS. 15A to 15C are graphic representations of aberrations of the imaging lens according to the fourth example of the present invention. FIG. 15A shows spherical aberration, FIG. 15B shows astigmatism, and FIG. 15C shows distortion.

FIGS. 16A to 16C are graphic representations of aberrations of the imaging lens according to the fifth example of the present invention. FIG. 16A shows spherical aberration, FIG. 16B shows astigmatism, and FIG. 16C shows distortion.

DETAILED DESCRIPTION

Hereinafter, an embodiment of the present invention will be described in detail with reference to the drawings.

Figure 1:
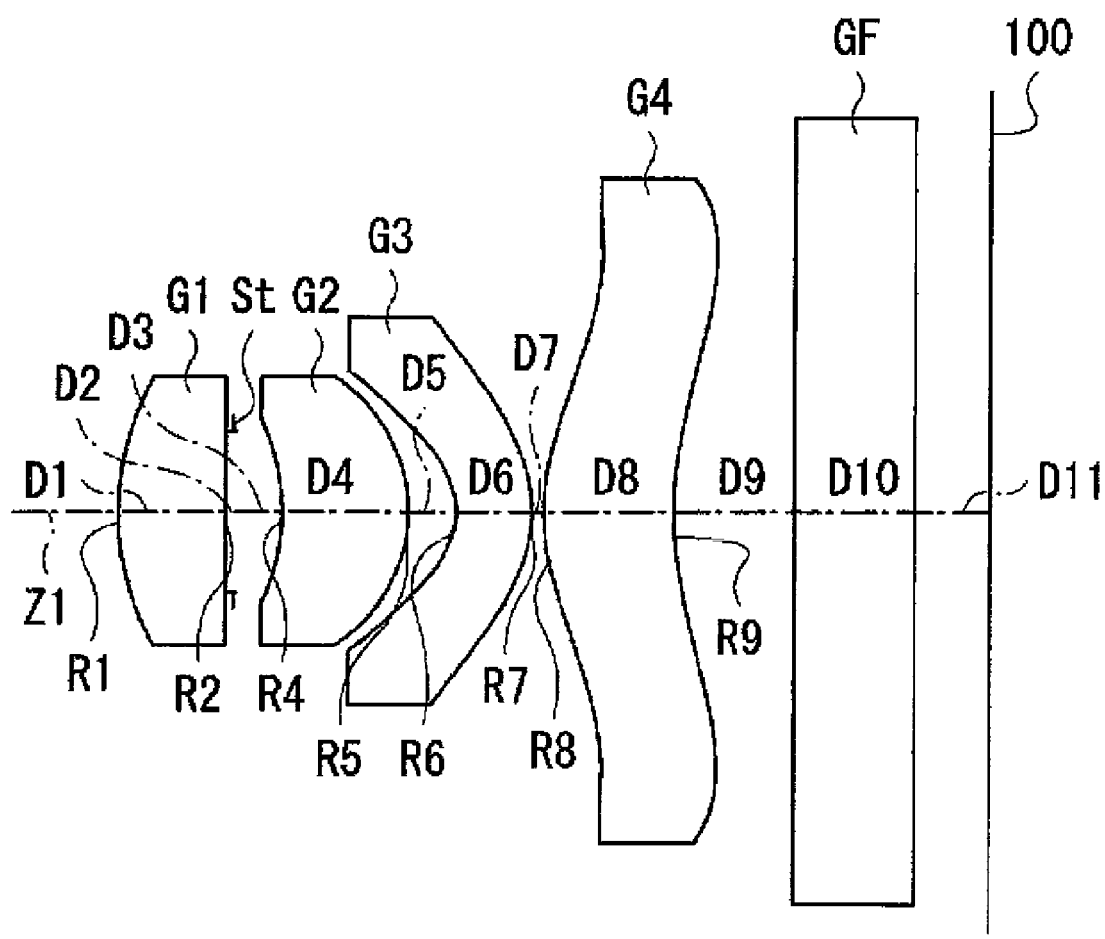
FIG. 1 shows a first structural example of an imaging lens according to an embodiment of the present invention is a lens cross-sectional view corresponding to a first example.

FIG. 1 shows a first structural example of an imaging lens according to the embodiment of the present invention. This structural example corresponds to the lens structure of a first numerical example (FIGS. 6A and 6B) described later. FIGS. 2 to 5 show a second to fifth structural examples, and correspond to the lens structures of a second to fifth numerical examples (FIGS. 7A and 7B through 10A and 10B) described later, respectively. In FIGS. 1 to 5, reference designation Ri represents the curvature radius of the i-th surface assigned a reference designation so that with the surface of the most object side as the first one, the number increases one by one toward the image side (image formation side). Reference designation Di represents the surface spacing, on the optical axis Z1, between the i-th surface and the (i+1)-th surface.

The imaging lens according to the present embodiment is suitable for use in various imaging apparatuses using an imaging device such as a CCD or a CMOS, particularly, comparatively small-size portable terminal apparatuses such as digital still cameras, portable cellar phones, and PDAs. This imaging lens includes, in order from the object side along the optical axis Z1, a first lens G1, a second lens G2, a third lens G3, and a fourth lens G4. This imaging lens also includes an aperture diaphragm St. The aperture diaphragm St is an optical aperture diaphragm, and disposed between the first lens G1 and the second lens G2.

The imaging apparatus according to the present embodiment includes the imaging lens according to the present invention and an imaging device 100 such as a CCD that outputs an imaging signal corresponding to an optical image formed by the imaging lens. The imaging device 100 is disposed on the image formation surface (imaging surface) of the imaging lens. Between the fourth lens G4 and the imaging device 100, various optical members GF may be disposed according to the structure of the camera to which the imaging lens is attached. For example, a flat optical member such as a cover glass for protecting the imaging surface or an infrared cut filter may be disposed. In this case, for example, a flat cover glass to which a coating having a filtering effect such as an infrared cut filter or an ND filter is applied may be used as the optical member GF.

Moreover, in this imaging lens, a coating having a filtering effect such as an infrared cut filter or an ND filter, or an anti-reflection coating may be applied to all of the first to fourth lenses G1 to G4 or to at least one lens surface.

In this imaging lens, the first lens G1 is a positive lens having a convex surface directed to the object side. It is desirable that the first lens G1 be a positive meniscus lens with a convex surface to the object side. The second lens G2 is a positive lens having a convex surface directed to the image side. It is desirable that the second lens G2 be a positive meniscus lens with a convex surface directed to the image side. The third lens G3 is a negative meniscus lens with a concave surface directed to the object side.

The configuration, near the optical axis, of the fourth lens G4 is a positive meniscus lens with a convex surface directed to the object side. Both surfaces of the fourth lens G4 are aspheric. It is desirable that each of the first lens G1, the second lens G2, and the third lens G3 includes at least an aspheric surface. It is desirable that the image side surface of the fourth lens G4 be an aspheric surface that is concave directed to the image side near the optical axis and convex directed to the image side in the periphery. It is also desirable that the object side surface thereof be an aspheric surface that is convex directed to the object side near the optical axis and concave directed to the object side in the periphery. As for the aspheric configuration, by making, particularly, the fourth lens G4 change in different configurations between the central part and the periphery, field curvature can be excellently corrected from the central part to the periphery of the image surface. In the fourth lens G4, the luminous flux is separated for each angle of view compared with the first lens G1, the second lens G2, and the third lens G3. For this reason, the image side surface of the fourth lens G4 which is the last lens surface closest to the imaging device 100 is provided with a configuration that is concave to the image side near the optical axis and convex to the image side in the periphery, whereby aberration correction for each angle of view is appropriately made and the angle of incidence of the luminous flux on the imaging device is controlled so as to be a predetermined angle or smaller. Consequently, the light amount nonuniformity in the entire area of the image formation surface can be reduced, and this structure is advantageous to correction of field curvature, distortion, and the like.

The imaging lens according to the present embodiment satisfies the conditional expressions shown below, and has a structure where the power of the first lens G1 is relatively weak and the powers of the second lens G2 and the third lens G3 are comparatively strong in the lens system. To increase the power of the third lens G3, the air space D5 between the second lens G2 and the third lens G3 is smaller in the periphery than near the optical axis. With this structure, the absolute value of the aspheric R6 of the object side surface of the third lens G3 is lower than that of the aspheric R5 of the image side surface of the second lens G2, so that the power of the third lens G3 can be increased.

$$f1 > f2 > |f3| \tag{1}$$

$$1.0 < f/f2 < 1.5 \tag{2}$$

Here, f1 is the focal length of the first lens G1, f2 is the focal length of the second lens G2, f3 is the focal length of the third lens G3, and f is the overall focal length of the lens system.

Moreover, it is desirable that the conditional expressions shown below be satisfied. Here, vd3 is the Abbe number of the third lens G3 at the d-line. Bf is the back focal length (air equivalent length), and TL is the overall length (distance from the most object side surface to the image surface in the optical axis). Ymax is the maximum image height.

$$vd3 < 35 \tag{3}$$

$$0.2 < Bf/TL < 0.5 \tag{4}$$

$$0.7 < Ymax/f < 0.9 \tag{5}$$

Next, the operation and effect, particularly, the operation and effect related to the conditional expressions of the imaging lens structured as described above will be described in more detail.

With the imaging lens according to the present embodiment, in a lens system including four lenses as a whole, since each lens has an appropriate configuration, a lens system can be easily obtained in which the angle of view is easily widened and manufacturability is excellent. In particular, since the aperture diaphragm St is disposed between the first lens G1 and the second lens G2, the performance degradation sensitivity to the manufacturing error and the like is low, and manufacturability is excellent.

Moreover, by satisfying the conditional expressions (1) and (2) so that the power of the first lens G1 is relatively weak and the powers of the second lens G2 and the third lens G3 are high in the lens system, the field curvature performance degradation due to increase in the angle of view is improved, so that the angle of view is easily widened. More specifically, by satisfying the relation of f1>f2 of the conditional expression (1), of the positive lenses, the second lens G2 bears the principal image formation function, so that a lens system of excellent performance is obtained in which field curvature is small when the angle of view is widened. If the relation of f1>f2 is reversed, a lens system with large field curvature is obtained. Moreover, by satisfying the relation of f2>|f3|, a lens system is obtained in which longitudinal chromatic aberration and lateral chromatic aberration can be reduced and increase in the number of pixels is supported. If the relation of f2>|f3| is reversed, a lens system with large chromatic aberration is obtained.

The conditional expression (2) means that the power of the second lens G2 constitutes a large part of the entire power. When f/f2 falls below the lower limit of the conditional expression (2), power is concentrated on the first lens G1, so that a lens system with large field curvature is obtained. When f/f2 exceeds the upper limit of the conditional expression (2) so that the power of the second lens G2 is too strong, a lens system with large longitudinal chromatic aberration and lateral chromatic aberration is obtained. To perform more excellent aberration correction, it is desirable that the following conditional expression (2A) be satisfied with respect to the second lens G2:

$$1.0 < f/f2 < 1.3 \tag{2A}$$

The conditional expression (3) defines the appropriate dispersion of the third lens G3. When vd3 exceeds the upper limit of the conditional expression (3), chromatic aberration correction is insufficient. To perform more excellent chromatic aberration correction, it is desirable that the Abbe number vd3 of the third lens G3 satisfy the following conditional expression (3A):

$$vd3 < 30 \tag{3A}$$

The conditional expression (4) shows the proportion of the back focal length Bf in the whole length TL. The value of the back focal length Bf in the conditional expression (4) is the air equivalent length when a filter, a cover glass, or the like is disposed. When Bf/TL falls below the lower limit of the conditional expression (4), the back focal length is short, so that the space for disposing an infrared cut filter, a low-pass filter, a cover glass, or the like cannot be secured. Conversely, when Bf/TL exceeds the upper limit so that the back focal length is too long, the whole length is too long, and the design is low in commercial value. With respect to the back focal length Bf, it is more desirable that the following conditional expression (4A) be satisfied:

$$0.3 < Bf/TL < 0.5 \tag{4A}$$

The conditional expression (5) corresponds to the imaging angle of view. The imaging lens according to the present embodiment is suitable for use on a comparatively wide-angle side that satisfies the conditional expression (5).

As described above, with the imaging lens according to the present embodiment, since the configuration of each lens is optimized in a lens system including four lenses s as a whole, a lens system can be realized in which the angle of view is easily widened and manufacturability is excellent. Moreover, by satisfying the desirable conditions as appropriate, high performance, for example, performance supporting as high as two mega-pixels or more, more desirably, five to ten mega-pixels can be obtained even if the angle of view is widened. Moreover, with the imaging apparatus according to the present embodiment, since an imaging signal corresponding to an optical image formed by the high-performance imaging lens according to the present embodiment is outputted, a comparatively wide-angle and high-resolution taken image can be obtained.

EXAMPLES

Next, concrete numerical examples of the imaging lens according to the present embodiment will be described. In the following, a plurality of numerical examples will be described at a time:

FIGS. 6A and 6B show concrete lens data corresponding to the structure of the imaging lens shown in FIG. 1. In particular, FIG. 6A shows the basic lens data thereof, and FIG. 6B shows data related to the aspheric surfaces. In the column of the surface number Si in the lens data shown in FIG. 6A, with respect to the imaging lens according to a first example, the numbers of the i-th surfaces are shown that are assigned reference designations so that with the surface of the most object side as the first one, the number increases one by one toward the image side. In the column of the curvature radius Ri, the values (mm) of the curvature radius of the i-th surfaces counted from the object side are shown so as to be associated with the reference designations Ri assigned in FIG. 1. Likewise, in the column of the surface spacing Di, the axial distances (mm) between the i-th surface Si and the (i+1)-th surface Si+1 counted from the object side are shown. In the column of Ndj, the values of the refractive indices at the d-line (587.6 nm) of the j-th optical elements counted from the object side are shown. In the column of vdj, the values of the Abbe numbers at the d-line of the j-th optical elements counted from the object side are shown.

In the imaging lens according to the first example, both surfaces of the first lens G1 to the fourth lens G4 are all aspheric. In the basic lens data of FIG. 6A, the numerical values of the curvature radii near the optical axis are shown as the curvature radii of the aspheric surfaces.

FIG. 6B shows the aspheric surface data in the imaging lens of the first example. In the numerical values shown as the aspheric surface data, the reference designation "E" indicates that the succeeding numerical value is the "exponent" to the base 10, and indicates that the numerical value represented by the exponential function to the base 10 is multiplied by the numerical value preceding "E". For example, "1.0E−02" represents "$1.0 \times 10^{-2}$".

As the aspheric data of the imaging lens of the first example, the values of the coefficients $B_n$ and K in the expression of the aspheric surface configuration expressed by the expression (A) shown below are shown. Z represents, more specifically, the length (mm) of the normal from a point on an aspheric surface situated at a height h from the optical axis, down to the tangential plane (plane vertical to the optical axis) to the vertex of the aspheric surface.

$$Z = CC h^2 / \{1 + (1 - K CC^2 h^2)^{1/2}\} + \Sigma B_n h^n \quad (A)$$

(n=an integer that is 3 or higher) where Z is the depth (mm) of the aspheric surface, h is the distance (height) (mm) from the optical axis to the lens surface, K is the eccentricity, CC is the paraxial curvature=1/R (R is the paraxial aspheric), and $B_n$ is the n-th aspheric coefficient.

The imaging lens of the first example is expressed by effectively using the degrees of $B_3$ to $B_{16}$ as the aspheric coefficients $B_n$.

Figure 2:
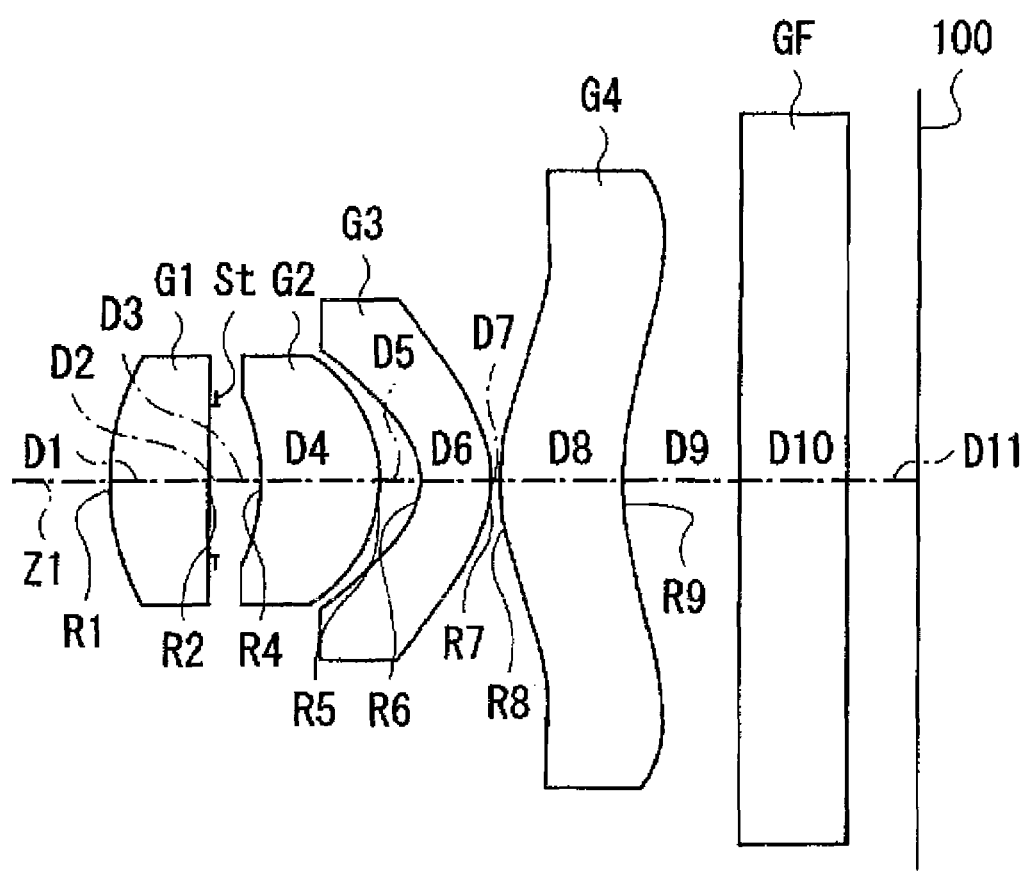
FIG. 2 shows a second structural example of the imaging lens according to the embodiment of the present invention is a lens cross-sectional view corresponding to a second example.
Figure 3:
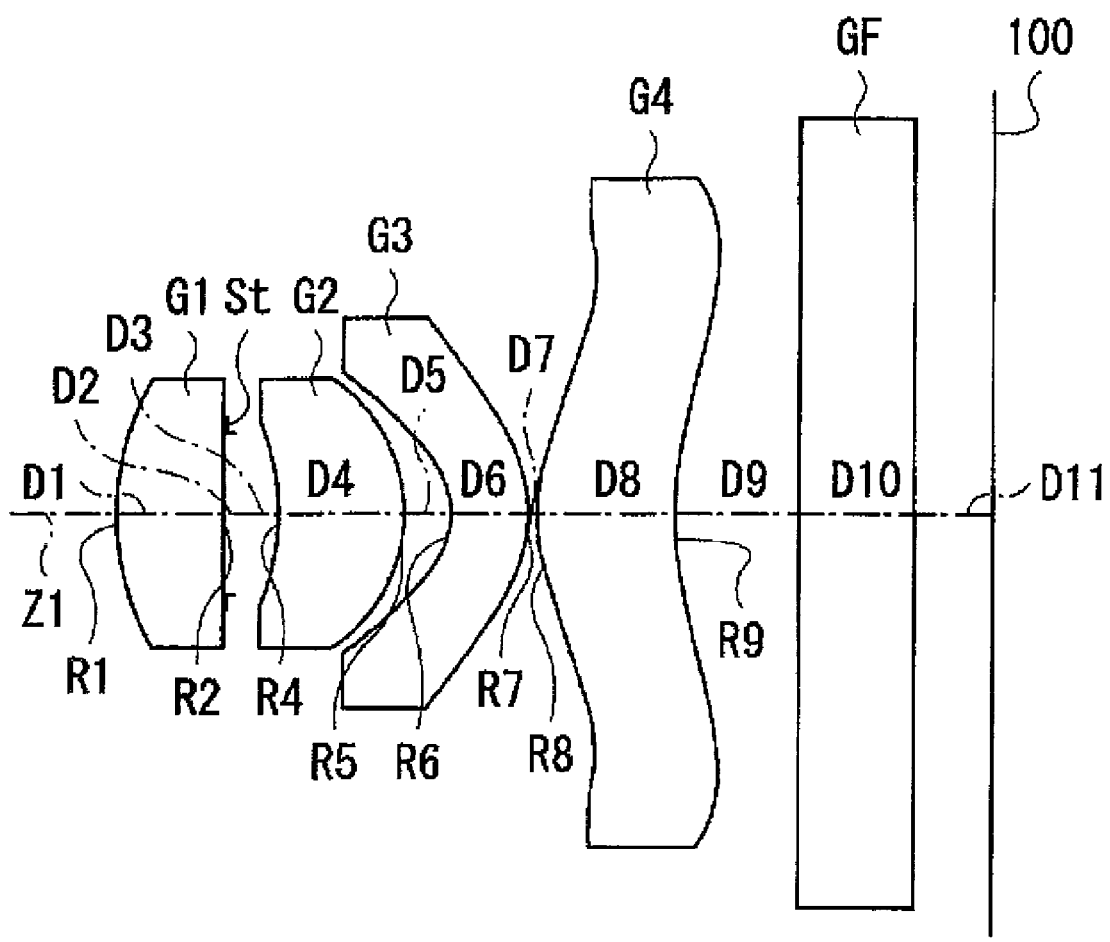
FIG. 3 shows a third structural example of the imaging lens according to the embodiment of the present invention is a lens cross-sectional view corresponding to a third example.
Figure 4:
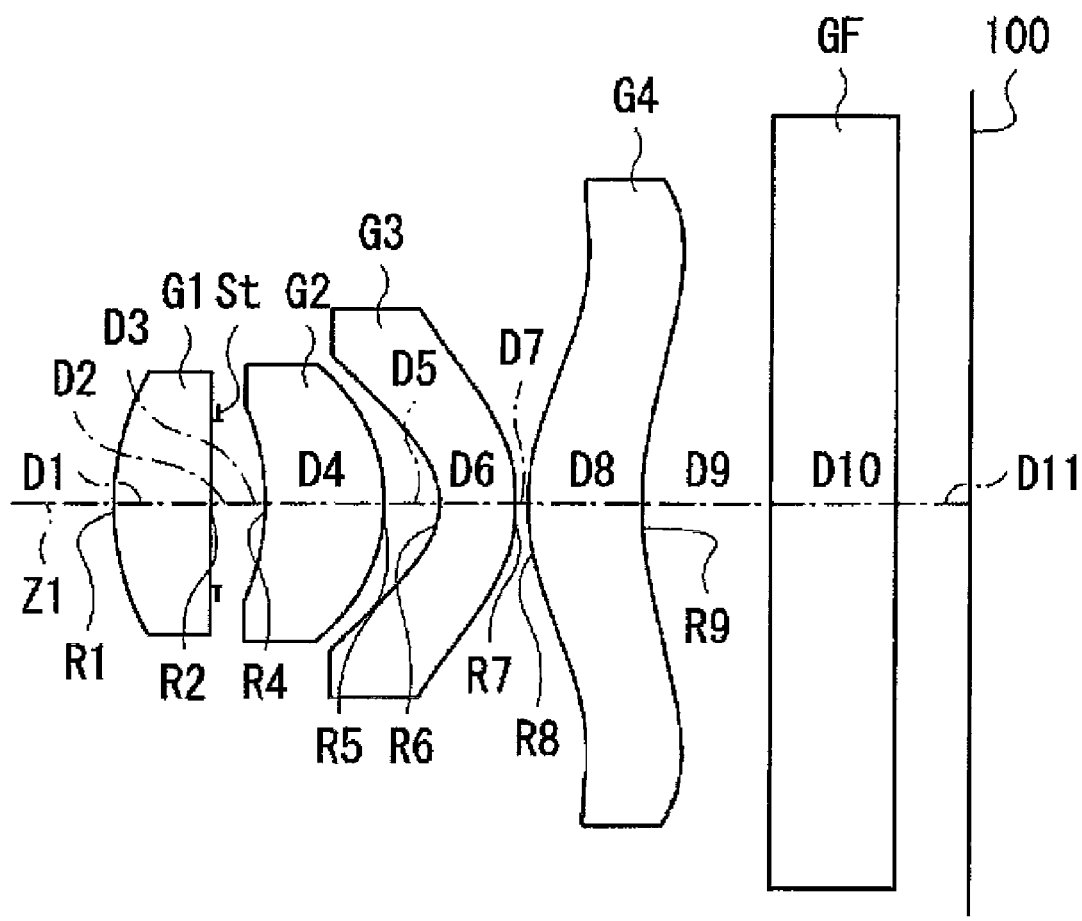
FIG. 4 shows a fourth structural example of the imaging lens according to the embodiment of the present invention is a lens cross-sectional view corresponding to a fourth example.
Figure 5:
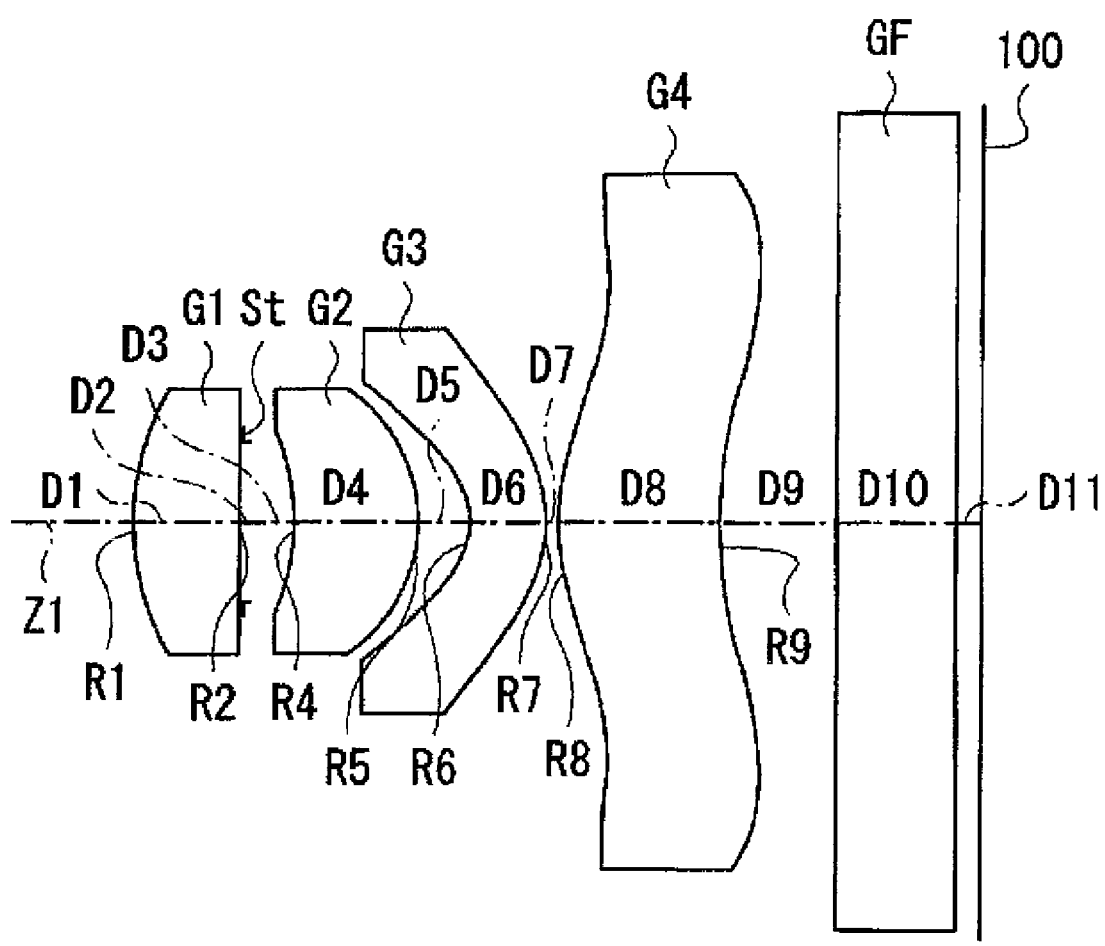
FIG. 5 shows a fifth structural example of the imaging lens according to the embodiment of the present invention is a lens cross-sectional view corresponding to a fifth example.

Similarly to the imaging lens of the first example described above, the concrete lens data corresponding to the structure of the imaging lens shown in FIG. 2 is shown in FIGS. 7A and 7B as a second example. Likewise, the concrete lens data corresponding to the structures of the imaging lenses shown in FIGS. 3 to 5 are shown in FIGS. 8A and 8B through 10A and 10B as a third to fifth examples, respectively. In the second to fifth examples, as in the imaging lens of the first example, both surfaces of the first lens G1 to the fourth lens G4 are all aspheric.

In FIG. 11, the values related to the conditional expressions shown above are summarized for each example. As is apparent from FIG. 11, the values of each example are within the ranges of the numerical values of the conditional expressions.

Figure 12A:
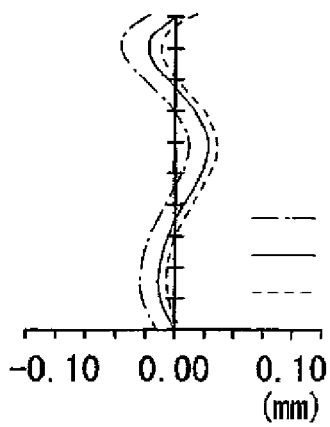
FIGS. 12A to 12C are graphic representations of aberrations of the imaging lens according to the first example of the present invention.
Figure 12B:
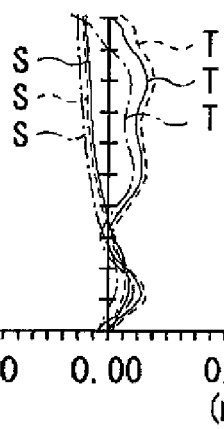
Figure 12C:
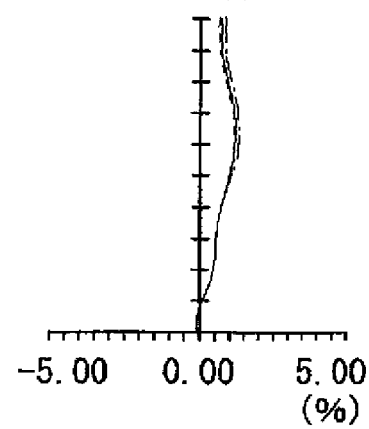
Figure 13A:
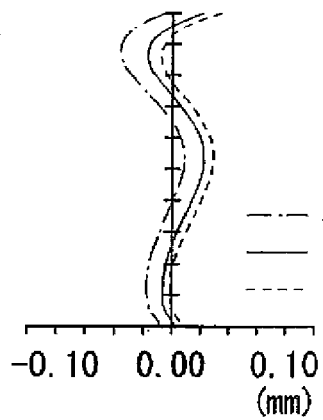
FIGS. 13A to 13C are graphic representations of aberrations of the imaging lens according to the second example of the present invention.
Figure 13B:
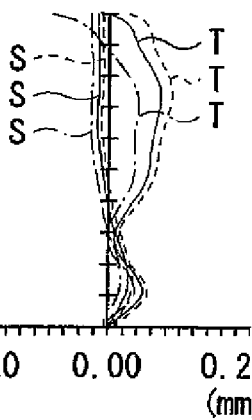
Figure 13C:
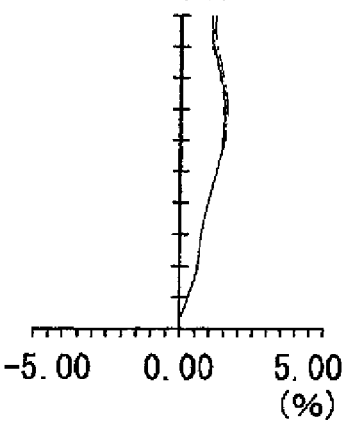

FIGS. 12A to 12C show the spherical aberration, the astigmatism, and the distortion in the imaging lens of the first example, respectively. In the graphic representation of astigmatism, S and T represent the aberrations in the sagittal and tangential directions, respectively. Y represents the image height.

Likewise, the aberrations in the imaging lenses according to the second to fifth examples are shown in FIGS. 13A, 13B and 13C through 16A, 16B and 16C, respectively.

As is apparent from the numerical data and the graphic representations of the aberrations described above, in each example, a lens system is realized the configuration of each lens of which is optimized and that is wide-angle and small-sized while maintaining excellent optical performance. In particular, performance suitable for the number of pixels of approximately eight mega-pixels is obtained.

The present invention is not limited to the above-described embodiment and examples, and various modifications are possible. For example, the values of the curvature radii, surface spacings, and refractive indices of the lens s are not limited to the values shown in the numerical examples, and may be different values.

While the above-described examples are all described based on the premise that they are used at fixed focus, a structure in which focus adjustment is possible may be adopted. For example, a structure may be adopted in which the entire lens system is moved out or automatic focusing can be performed by moving some lenses on the optical axis.

While design examples suitable for the number of pixels of approximately eight mega-pixels are shown in the above-described examples, in the imaging lens of the present embodiment, excellent performance is obtained even if the number of pixels is larger, for example, approximately ten mega-pixels. Moreover, excellent performance is obtained even if the number of pixels is smaller than eight mega-pixels.

What is claimed is:
1. An imaging lens comprising in order from an object side:
   a first lens that includes a positive lens having a convex surface directed to the object side;
   a stop;
   a second lens that includes a positive lens having a convex surface directed to an image side;
   a third lens that includes a negative meniscus lens with a concave surface directed to the object side; and a fourth lens that includes, near an optical axis, a positive meniscus shape with a convex surface directed to the object side,
wherein an air space between the second lens and the third lens is smaller in a periphery than near the optical axis, and
the following conditional expressions are satisfied:

$$f1 > f2 > |f3| \quad (1)$$

$$1.0 < f/f2 < 1.5 \quad (2)$$

where f1 is a focal length of the first lens, f2 is a focal length of the second lens, f3 is a focal length of the third lens, and f is an focal length of the whole lens system.

2. The imaging lens according to claim 1,
wherein the following condition expression is further satisfied:

$$0.7 < Ymax/f < 0.9 \quad (5)$$

where Ymax is a maximum image height.

3. An imaging apparatus comprising:
the imaging lens according to claim 1; and
an imaging device that outputs an imaging signal corresponding to an optical image formed by the imaging lens.

4. The imaging lens according to claim 1, wherein the first lens is a positive meniscus lens.

5. The imaging lens according to claim 1, wherein the second lens is a positive meniscus lens.

6. The imaging lens according to claim 1, wherein both surfaces of the fourth lens are aspheric.

7. The imaging lens according to claim 1, wherein each of the first lens, the second lens, and the third lens includes at least an aspheric surface.

8. The imaging lens according to claim 1, wherein the image side surface of the fourth lens is an aspheric surface that is concave directed to the image side near the optical axis and convex directed to the image side in the periphery.

9. The imaging lens according to claim 1, wherein the object side surface of the fourth lens is an aspheric surface that is convex directed to the object side near the optical axis and concave directed to the object side in the periphery.

10. The imaging lens according to claim 1, wherein the following conditional expression is further satisfied:

$$vd3 < 30 \quad (3A)$$

where vd3 is an Abbe number of the third lens at the d-line.

11. The imaging lens according to claim 1, wherein the following conditional expression is further satisfied:

$$0.3 < Bf/TL < 0.5 \quad (4A)$$

where Bf is an air equivalent back focal length and TL is an whole length which shows a distance from a most object side surface to an image surface in the optical axis.

12. The imaging lens according to claim 1,
wherein the following conditional expression is further satisfied:

$$vd3 < 35 \quad (3)$$

where vd3 is an Abbe number of the third lens at the d-line.

13. The imaging lens according to claim 12,
wherein the following conditional expression is further satisfied:

$$0.2 < Bf/TL < 0.5 \quad (4)$$

where Bf is an air equivalent back focal length and TL is an whole length which shows a distance from a most object side surface to an image surface in the optical axis.

14. The imaging lens according to claim 12,
wherein the following condition expression is further satisfied:

$$0.7 < Ymax/f < 0.9 \quad (5)$$

where Ymax is a maximum image height.

15. An imaging apparatus comprising:
the imaging lens according to claim 12; and
an imaging device that outputs an imaging signal corresponding to an optical image formed by the imaging lens.

16. The imaging lens according to claim 1,
wherein the following conditional expression is further satisfied:

$$0.2 < Bf/TL < 0.5 \quad (4)$$

where Bf is an air equivalent back focal length and TL is an whole length which shows a distance from a most object side surface to an image surface in the optical axis.

17. The imaging lens according to claim 16,
wherein the following condition expression is further satisfied:

$$0.7 < Ymax/f < 0.9 \quad (5)$$

where Ymax is a maximum image height.

18. An imaging apparatus comprising:
the imaging lens according to claim 16; and
an imaging device that outputs an imaging signal corresponding to an optical image formed by the imaging lens.

* * * * *